United States Patent Office 3,431,126
Patented Mar. 4, 1969

3,431,126
METHOD FOR PRODUCING PORCELAIN
SUITABLE FOR INSULATOR
Hiroshi Fukui, Nagoya, Japan, assignor to NGK Insulators, Ltd., Mizuho-ku, Nagoya, Japan, a corporation of Japan
No Drawing. Filed Apr. 19, 1965, Ser. No. 449,270
Claims priority, application Japan, Apr. 27, 1964, 39/23,721
U.S. Cl. 106—46                   3 Claims
Int. Cl. C04b 35/14, 33/26

ABSTRACT OF THE DISCLOSURE

A method for producing porcelain having a total crystal content of about 35 to 75% by weight and comprising about 25 to 50% cristobalite, about 5 to 15% quartz and the essential balance mullite crystal, based on the total weight of porcelain, said method comprising mixing 20 to 30% by weight of feldspar, about 40 to 55% by weight of quartz and about 30 to 50% by weight of clay, shaping the mixture, drying the shaped mass and firing said mass at a temperature of about 1,250° C. to 1,380° C. The raw materials are selected to yield about 65 to 80% by weight of $SiO_2$, about 2.0 to 4.0% by weight of alkali oxide, about 0.5% to 1.5% by weight of $Fe_2O_3$, about 0.2 to 1.3% by weight of $TiO_2$, less than about 0.5% by weight of each of $CaO$ and $MgO$ and less than about 1.0% by weight of other impurities, wherein the $SiO_2/Al_2O_3$ ratio is about 2.8 to 4.5 and the $K_2O/Na_2O$ ratio is about 0.01 to 1.5.

---

This invention relates to the manufacture of porcelain suitable for insulator. More particularly this invention relates to the manufacturing method of insulator porcelains having size and thickness larger than common ceramic ware, which can be produced economically and regularly in a mass production process. In one respect, this invention relates to the manufacturing method of electric insulator porcelain products having superior properties in electric insulation, mechanical strength, resistance to corrosion, and resistance to thermal shock, particularly in the characteristics necessary for high or superhigh voltage insulators.

There has been no insulator porcelain known satisfactory both in the above-mentioned properties and in the above-mentioned manufacturing method. Accordingly, an object of the present invention is to provide such a manufacturing method of insulator porcelains as above-mentioned. Another object of the present invention is to provide insulator porcelains having the above-mentioned properties. These objects and other advantages are attained by the present invention.

According to the present invention a mineralogical composition limited in a certain indispensable range so as to give porcelains the above-mentioned superior characteristics is maintained with reliability and reproducibility by limiting the preparation of principal raw materials consisting of a system of feldspar-clay-quartz, so as to make the chemical compositions fall within certain ranges, incorporating certain amounts of necessary small-amount-composition therein, and firing the bodies processed through steps known in the case of common porcelain such as preparing and shaping, at a temperature of from 1250° C. to 1380° C.

The bodies obtained by firing the green bodies consisting of felspar, clay and quartz are constructed with two phases of the mullite and quartz crystal phase and non-homogeneous fused glass phase with occasional cristobalite crystal phase. As for the appearance of mechanical strength in such bodies, there have been several studies known. The trend of these studies is represented by so called "structural stress theory" which is related to internal stress originated by the compressive force exerted upon the glassy material phase surrounding the crystal phases mainly during the cooling period of the firing owing to the difference of thermal expansion coefficients. It is difficult to say definitely at the present time when no decisive study is found as to the strength of porcelain material, that internal stress alone dominates strength, but it is certain that it is an element having an important effect thereupon. When internal stress is produced intentionally and its amount is to be controlled, the relationship between the kind of crystal produced in the porcelain, and the amounts of crystal and glassy material naturally comes into question. The maintenance of these conditions in certain appropriate ranges has some connection with elements which are related to strength and are other than internal stress e.g., degree of particle packing, density, strengths of crystalline material and glassy material and further it also governs characteristic properties other than mechanical properties, e.g., electric insulation, resistance to corrosion and resistance to thermal shock.

The inventor of the present invention has made extensive studies on the problem of deciding the mineralogical constitution of porcelain which most perfectly satisfies the various characteristics required for insulators and on the method of manufacturing such a porcelain commercially in a regular stabilized process and arrived at the following conclusion.

The mechanical strength increases in accordance with the amount of crystals in the porcelain but it has a certain limit beyond which it shows reduction. Moreover it is a necessary condition to crystalize into cristobalite by adding quartz since in accordance with the amount of cristobalite, the mechanical strength increases. However it has also a limit and the amount of quartz has also a suitable range. It is most preferable to make the greater of the remaining part mullite so as to create suitable internal stress considering that it crystalizes into this form most easily among those crystal phases, other than cristobalite or quartz, and belongs to the system of felspar-clay-quartz and also considering it from the point of its characteristic thermal expansion coefficient. This fact appears considerably distinctly as seen in the experimental data in Table 1. According to Table 1, the range of constitutional amounts of cristobalite, quartz and mullite which shows the highest mechanical strength is somewhat deviated from the range which shows the most preferable value in other characteristics. For example, though not distinct, the tendency of increase in resistance to thermal shock reduces the mechanical strength that much.

The object of the present invention is to provide a method for manufacturing insulator porcelain. Hence considering the characteristics required for insulators, it is concluded that the following limitation as to the range is most suitable: porcelain having such a mineral assemblage as total crystal amount ranging from 35 to 75 percent by weight, cristobalite ranging from 25 to 50 percent by weight, quartz ranging from 5 to 15 percent by weight and the remainder being mullite crystal. This is a required condition for the porcelain of the present invention but other conditions are important. The limitation as to the chemical compositions is necessary thereupon. Unless the glassy material phase surrounding the crystal phases also has limitations in its own mechanical strength, thermal expansion coefficient and the reaction preceding on the boundary with crystals, the object of the present invention cannot be attained. On this account the chemical composition of glass phase must be limited in a certain range.

In order to realize the above-mentioned relationship between two phases, crystal and glassy material, the extent of progress of transformation reaction of quartz must be controlled in the first place. Though considerably detailed studies have been made as to the transformation of quartz there is no work done in the case when various kinds of other compositions coexist.

In order to limit the total amount of crystal and to specify the amount of quartz, the amount of deposition of mullite must be controlled. On this account it is necessary to clarify the relation of the amount of alumina and silica as original materials of deposition, the amount of alkali as flux, the influence of other composition components and the group of these compositions to be introduced.

As one feature of this invention, explanation will be given relating to the influence of small-amount-composition. The weight percent of the chemical composition hereinafter described is the values relative to the final porcelain product.

In order to give commercial products economically, it is necessary to use natural minerals or rocks as raw materials. Moreover in order to obtain stabilized products in the ceramic industry requiring a step of process such as the use of a kiln which occasionally sustains considerable change, particularly in the case of porcelain like the present case, it is required to sufficiently control the raw materials, to check the chemical composition and to limit it within a definite range. However with these alone, it is extremely difficult to secure the reliable reproducibility in the products which possess the highest grade of various characteristics such as the porcelain of the present invention and in which the mineralogical and chemical compositions are strictly regulated in the final products. It is necessary to use a kind of stabilizing agent to control the progress of reaction. According to the present invention, the materials which perform such roles are $Fe_2O_3$ and $TiO_2$. By the coexistence of these two substances the object of the present invention can be attained. In Table 2 experimental data relating to the effect of these two are shown. It is seen that in examples of formulation which do not contain $Fe_2O_3$ and $TiO_2$, mineralogical compositions of final products are distributed in a considerably wide range due to the change sustained in the steps particularly in the firing step even when the other compositions are maintained constant. The contents of $Fe_2O_3$ and $TiO_2$ are most suitable when they fall in the range from 0.5 to 1.5 percent by weight and from 0.2 to 1.3 percent by weight respectively. The amount of $Fe_2O_3$ greater than this value does not reduce the effect as a stabilizer but a defect of coloring or speck forming appears on the products which not only occasionally affects the appearance but also specked spots extremely reduces the mechanical strength and electric insulation, while being attended with the danger of crack formation under the load of the weight or test voltage applied. $TiO_2$ does not particularly create notable defect even when its amount is increased but the effect as a stabilizer is not also increased thereby. Rather, if it is intended to incorporate greater amounts of this material therein, greater amounts of it must be added in the form of, e.g., $TiO_2$. This is not preferable from the point of raw material cost. In this regard, it is suitable to set the limt at about 1.3 percent by weight.

As for sources of $FE_2O_3$ and $TiO_2$ the comparative experiment is carried out between raw materials containing great amounts of $Fe_2O_3$ and $TiO_2$ (e.g. rouge of iron and titanium oxide powder) and those included as small amount-composition in natural minerals used for the purpose of supplying alumina and silica. Though the former case shows slightly better result, the difference is not so great that each may be considered to be useful so long as it satisfies the requirement of mineralogical constitution of porcelain.

Alkaline component are supplied mainly from feldspar. Acting as flux, it performs important roles in the deposition of mullite and cristobalite.

In order to carry out the stabilized commercial production of large-sized, thick products, there must be naturally the limitation of firing temperature. In the present invention a temperature of 1250° C. to 1380° C. is adopted as the firing temperature which is suitable and economical for exhibiting sufficient characteristics.

In carrying out sufficient vitrification and required deposition of mullite and cristobalite, it is confirmed that the absolute amount of alkali oxide (it will be referred to hereinafter as alkali amount) as well as the ratio of $K_2O/Na_2O$ in the alkaline component gives an important effect. In other words it is required that the alkali amount is in the range of 2.0 to 4.0 percent by weight based upon the total weight and the ratio of $K_2O/Na_2O$ is in the range of 0.01 to 1.5 percent by weight. If the alkali amount is increased too much over this range it makes the product soften too much during the firing and produces such defects as failing to hold the original shape owing to its own heavy weight in the case of large-sized products and further brings about the conspicuous reduction of mechanical strength. If this amount is too small, the proceeding of reaction does not reach a definite extent, the product having the desired structure cannot be obtained any more, and in an extreme case, bodies are porous and particularly harmful effects are exerted upon electric insulation, mechanical strength and resistance to corrosion.

The ratio of $K_2O/Na_2O$ is one of the interesting facts discovered by the study relating to the present invention and it is now an indispensable condition for obtaining a product having the desired constitution. In other words if the ratio of $K_2O/Na_2O$ is taken greater than 1.5 the firing range allowable for obtaining a product having the desired constitution becomes exceedingly short which makes it impossible to obtain homogeneous products. Further it is seen from the experimental data of Table 3 that the amount of cristobalite deposited increases according as the $Na_2O$ component increases. This effect upon the deposition of cristobalite is a general fact already recognized, but so long as the porcelain of the present invention is concerned, the limitation is not for the deposition amount of cristobalite but it is a condition set to achieve stabilized reproducibility, commercially. In order to introduce this alkali composition, particularly to introduce the necessary amount of $Na_2O$, it is not favorable to add a raw material containing a large amount of $Na_2O$, e.g. a reagent of suitable sodium salt.

The object of the porcelain of the present invention is the production of large-sized, thick products. Hence when a large amount of sodium ion, dissociates at the step of preparation, shaping and drying, while starting from the states containing water, the deflocculation phenomenon of clay as is well known appears in an extent more than required which makes it impossible to shape large-sized products and makes the drying extremely difficult. Accordingly such materials as felsparthic raw material which contain alkali in the compound state is necessary. It is, further necessary to use at least more than half amount of felsparthic raw material with the form of sodium felsparthic raw material. Furthermore it is a necessary condition to realize the ratio of the above-mentioned $K_2O/Na_2O$ ranging from 0.01 to 1.5 mostly by the alkali contained in the felsparthic raw material. The lower ratio of $K_2O/Na_2O$ of 0.01 is brought about naturally on account of this condition. In other words, this indicates that there are hardly any felsparthic raw material containing no $K_2O$ at all existing and further it is the lower limit of $K_2O$ naturally brought in the case when economical commercial material is used.

The required amount of silica and alumina can be assumed approximately from the mineralogical constitution of objective product. According to the result confirmed by experiment, it is necessary that the ratio of $SiO_2/Al_2O_3$ is in the range of 2.8 to 4.5 and the amount of $SiO_2$ is in the range of 65 to 80 percent by weight relative to the total amount.

These materials are divided into those constituting crystalline phases and those constituting glassy material phase. These materials have influence more in the point of ratio of $SiO_2/Al_2O_3$ rather than in the point of their absolute amount. The use of these two compositions in such proportions is rather a well-known fact when taken up alone but it is one of the necessary conditions for the porcelain of the present invention when combined with the condition of other compositions.

As for the source of these materials, since the object is economical products, a combination of raw materials of clay type ones, quartz type ones and felspar type ones which are commonly used becomes principal raw material. The mineral assemblage of principal raw material of the present invention must fall within the range of 20 to 30 percent by weight felspar substance, 40 to 55 percent by weight quartz substance and 30 to 50 percent by weight clay substance so as to achieve the above-mentioned conditions.

Other compositions being second to principal compositions are CaO and MgO but they are not the kinds which cause particular influence. No special consideration is necessary so long as the amounts are such extends as commonly found as impurities of each raw materials i.e. less than 0.5 percent by weight each.

By setting up above-mentioned limitation in the chemical composition it is possible to deposit the objective crystals in the amounts of definite ranges, to have the composition other than those contained in the crystals fuse and form a glass phase and to make the chemical compositions of the glass phase fall in a definite range, Table 3 indicates the influence of the chemical composition of bodies by mixing raw materials upon the mineralogical composition and characteristic properties of fired products.

Thus, in order to start from the principal raw materials of natural minerals belonging to feldspar group, clay and silica group and to obtain products having desired mineralogical composition, the preparation is carried out by selecting raw materials so as to give the $SiO_2$ amount of 65 to 80 percent by weight based upon the total amount, the $SiO_2/Al_2O_3$ ratio of 2.8 to 4.5, the alkali oxide amount of 2.0 to 4.0 percent by weight based upon the total amount, the $K_2O/Na_2O$ ratio of 0.01 to 1.5, the $Fe_2O_3$ amount of 0.5 to 1.5 percent by weight, the $TiO_2$ amount of 0.2 to 1.3 percent by weight and each of the amount of CaO and MgO of less than 0.5 percent by weight and after passing the common various steps of mixing, shaping and drying, the firing is carried out at a temperature of 1250° C. to 1380° C. By such arrangement and proceeding, it is possible to produce porcelain having superior properties particularly for insulator porcelain, in a commercially stabilized process.

Further as above-mentioned, as for feldsparthic raw material, at least more than half of it must be in the form of sodium group felspar, but the above-mentioned conditions can be realized with commercial raw materials without accompanying special troubles. Embodiments of formulation will be illustrated in examples hereinafter described but if necessary it is possible to use chemical raw material containing particularly large amount of either of $Fe_2O_3$, $TiO_2$ and $Al_2O_3$. For example, total required amounts of $Fe_2O_3$ and $TiO_2$ and less than 5 percent of required amount of $Al_2O_3$ can be introduced from chemical raw material.

In the industrial process, it is necessary to bring the chemical composition of raw materials used under a strict control. As shown in examples, the green bodies prepared in the present invention have high workability, are easy in the processing of large-sized products and do not need special method in every step of preparing, shaping and drying. For example, when the moisture content is adequately changed in the shaping, it is possible to adopt any of the processes such as shaping by extrusion, shaping by casting, soft mud press, dry powder press or the like.

For the purpose of reducing production cost, natural raw materials are mostly used in the present method, hence the existence of small amount of impurities cannot be avoided. However, it hardly affects the product porcelain so long as their total amount is lower than 1.0 percent based upon the analytical value of the final product.

TABLE 1.—MINERALOGICAL COMPOSITIONS AND CHARACTERISTIC VALUES OF FELDSPAR-CLAY-QUARTZ TYPE PORCELAIN FIRED AT A TEMPERATURE OF 1,250° C. TO 1,380° C.

| Experimental Number | Cristobalite, percent | Mullite, percent | Quartz, percent | Glass phase, percent | Total crystal, percent | Mechanical strength, kg./cm.$^2$ | Volume resistivity, $\Omega$-cm.$\times 10^{12}$ | Resistance to acid, percent | Resistance to thermal shock, °C. |
|---|---|---|---|---|---|---|---|---|---|
| 1 | 38.6 | 10.9 | 27.0 | 23.5 | 76.5 | 1,250 | 1.4 | 0.10 | 100 |
| 2 | 35.3 | 19.4 | 9.1 | 36.2 | 63.8 | 1,510 | 1.4 | 0.07 | 95 |
| 3 | 7.3 | 8.3 | 8.0 | 76.4 | 23.6 | 950 | 0.8 | 0.09 | 143 |
| 4 | 2.1 | 13.1 | 25.0 | 59.8 | 40.2 | 850 | 0.8 | 0.35 | 150 |
| 5 | 28.9 | 29.1 | 8.9 | 33.1 | 66.9 | 1,330 | 1.5 | 0.09 | 97 |
| 6 | 31.2 | 23.1 | 5.8 | 39.9 | 60.1 | 1,480 | 1.8 | 0.07 | 93 |
| 7 | 20.0 | 17.2 | 6.4 | 56.4 | 43.6 | 1,160 | 1.2 | 0.10 | 128 |
| 8 | 9.8 | 25.7 | 16.6 | 47.9 | 52.1 | 920 | 1.0 | 0.07 | 130 |
| 9 | 0.0 | 18.3 | 21.3 | 60.4 | 39.6 | 880 | 1.0 | 0.08 | 142 |
| 10 | 30.6 | 32.8 | 1.7 | 34.9 | 65.1 | 1,230 | 1.4 | 0.08 | 120 |
| 11 | 40.2 | 42.9 | 11.9 | 5.0 | 95.0 | 1,250 | 1.4 | 0.10 | 120 |
| 12 | 9.4 | 5.2 | 5.4 | 80.0 | 20.0 | 900 | 1.1 | 0.08 | 154 |
| 13 | 12.9 | 13.6 | 8.2 | 65.3 | 34.7 | 930 | 1.0 | 0.09 | 140 |
| 14 | 14.9 | 26.7 | 12.7 | 45.7 | 54.3 | 910 | 0.7 | 0.07 | 146 |
| 15 | 4.0 | 33.5 | 6.3 | 56.2 | 43.8 | 940 | 0.9 | 0.07 | 135 |
| 16 | 18.5 | 19.9 | 9.6 | 52.0 | 48.0 | 1,020 | 0.8 | 0.09 | 130 |
| 17 | 25.3 | 29.6 | 5.0 | 40.1 | 59.9 | 1,280 | 1.4 | 0.10 | 115 |
| 18 | 21.2 | 21.5 | 13.5 | 43.8 | 56.2 | 1,000 | 0.8 | 0.12 | 128 |
| 19 | 15.7 | 5.4 | 6.5 | 72.4 | 27.6 | 1,130 | 1.3 | 0.09 | 115 |
| 20 | 29.8 | 30.7 | 3.8 | 35.7 | 64.3 | 1,250 | 1.4 | 0.10 | 110 |

Note.—Mechanical strength is transverse breaking test of 100 mm.$\phi$ round rod at a 100 mm. span. Resistance to acid is measured by powder method (Japanese Industrial Standards). Resistance to thermal shock is indicated by the temperature difference of crack forming with 20 mm.$\phi$ x 50 mm. round rod test pieces.

TABLE 2.—INFLUENCE OF $TiO_2$ AND $Fe_2O_3$ UPON THE MINERALOGICAL COMPOSITION OF PORCELAIN

| Experimental No. | Ignition loss | Chemical compositions of raw material mixture, percent | | | | | | | | | Mineralogical compositions of fired product, percent | | | | |
|---|---|---|---|---|---|---|---|---|---|---|---|---|---|---|---|
| | | $SiO_2$ | $Al_2O_3$ | $Fe_2O_3$ | $TiO_2$ | CaO | MgO | $K_2O$ | $Na_2O$ | Total | Cristobalite | Mullite | Quartz | Total crystal | Glass phase |
| 1 | 0.08 | 71.21 | 24.50 | 0.61 | 0.53 | 0.24 | 0.23 | 0.88 | 1.75 | 100.03 | 37.5 | 19.5 | 6.4 | 63.4 | 36.6 |
| 2 | 0.06 | 70.78 | 25.16 | 0.32 | 0.40 | 0.22 | 0.23 | 0.93 | 1.60 | 99.69 | 21.7 | 17.3 | 20.7 | 59.7 | 40.3 |
| 3 | 0.11 | 69.63 | 25.12 | 0.48 | 1.42 | 0.20 | 0.26 | 0.89 | 1.87 | 99.98 | 24.8 | 16.9 | 16.1 | 57.8 | 42.2 |
| 4 | 0.05 | 72.70 | 22.15 | 1.63 | 0.23 | 0.24 | 0.23 | 1.07 | 1.76 | 100.06 | 33.6 | 18.6 | 8.0 | 60.2 | 39.8 |
| 5 | 0.09 | 73.15 | 21.83 | 1.07 | 0.96 | 0.20 | 0.22 | 0.82 | 1.95 | 100.29 | 39.4 | 20.1 | 6.0 | 65.5 | 34.5 |
| 6 | 0.08 | 71.05 | 24.30 | 0.31 | trace | 0.18 | 0.21 | 1.05 | 1.88 | 99.06 | 20.8 | 22.5 | 13.6 | 56.9 | 43.1 |
| 7 | 0.09 | 71.59 | 23.87 | 0.76 | 0.12 | 0.17 | 0.23 | 0.84 | 1.82 | 99.49 | 29.9 | 18.0 | 9.7 | 57.6 | 42.4 |
| 8 | 0.09 | 69.84 | 24.01 | 0.53 | 2.43 | 0.18 | 0.26 | 0.96 | 1.80 | 100.10 | 35.8 | 19.2 | 7.2 | 62.2 | 37.8 |
| 9 | 0.10 | 72.48 | 22.30 | 1.74 | trace | 0.23 | 0.22 | 0.98 | 1.96 | 100.01 | 26.3 | 17.0 | 14.2 | 57.5 | 42.5 |
| 10 | 0.11 | 68.46 | 22.98 | 1.95 | 3.09 | 0.20 | 0.27 | 1.13 | 1.89 | 100.08 | 33.1 | 18.7 | 9.6 | 61.4 | 38.6 |

TABLE 3.—INFLUENCE OF $Al_2O_3$, $SiO_2$, $Na_2O$, $K_2O$ AND THE LIKE UPON THE CHARACTERISTIC PROPERTIES OF PORCELAIN

| Experimental No. | Ignition loss | Chemical compositions of raw material mixtures ||||||||| |
|---|---|---|---|---|---|---|---|---|---|---|
| | | $SiO_2$ | $Al_2O_3$ | $Fe_2O_3$ | $TiO_2$ | CaO | MgO | $K_2O$ | $Na_2O$ | Total |
| 1 | 0.08 | 71.21 | 24.50 | 0.61 | 0.53 | 0.24 | 0.23 | 0.88 | 1.75 | 100.03 |
| 2 | 0.06 | 70.22 | 24.34 | 0.71 | 0.89 | 0.18 | 0.45 | 1.12 | 2.01 | 99.98 |
| 3 | 0.05 | 71.41 | 23.75 | 0.72 | 0.51 | 0.16 | 0.12 | 1.52 | 1.71 | 99.95 |
| 4 | 0.05 | 74.19 | 20.35 | 0.51 | 0.43 | 0.16 | 0.13 | 3.01 | 0.71 | 99.54 |
| 5 | 0.12 | 75.57 | 19.22 | 0.43 | 0.92 | 0.27 | 0.21 | 2.69 | 0.62 | 100.05 |
| 6 | 0.06 | 70.45 | 22.25 | 0.61 | 0.71 | 0.15 | 0.48 | 2.53 | 2.78 | 100.02 |
| 7 | 0.08 | 71.55 | 20.31 | 0.31 | 3.91 | 0.17 | 0.28 | 1.81 | 1.51 | 99.93 |
| 8 | 0.08 | 74.10 | 21.87 | 0.92 | 0.51 | 0.21 | 0.18 | 2.46 | 0.63 | 100.96 |
| 9 | 0.06 | 72.82 | 22.57 | 0.78 | 0.68 | 0.27 | 0.17 | 0.59 | 1.93 | 99.87 |
| 10 | 0.18 | 72.60 | 21.19 | 1.02 | 0.75 | 0.16 | 0.28 | 3.06 | 0.80 | 100.04 |
| 11 | 0.04 | 72.54 | 22.41 | 0.88 | 0.58 | 0.20 | 0.22 | 0.59 | 2.52 | 9.98 |

| Experimental No. | Mineralogical compositions of fired products ||||| Characteristic values ||||| |
|---|---|---|---|---|---|---|---|---|---|---|
| | Cristo-balite | Mullite | Quartz | Total crystal | Glass phase | Mechanical strength, kg./cm.² | Volume resistivity, ×10¹² | Resistance to thermal shock, °C. | Resistance to acid, percent | Warpage, mm. |
| 1 | 39.4 | 19.5 | 6.4 | 65.3 | 34.7 | 1,100 | 1.6 | 130 | 0.06 | 6.1 |
| 2 | 38.7 | 19.9 | 8.0 | 66.6 | 33.4 | 1,350 | 1.3 | 136 | 0.07 | 7.2 |
| 3 | 34.7 | 20.1 | 7.8 | 62.6 | 37.4 | 1,030 | 1.8 | 149 | 0.05 | 8.0 |
| 4 | 25.3 | 15.5 | 19.8 | 60.6 | 39.4 | 900 | 1.0 | 122 | 0.08 | 11.3 |
| 5 | 26.4 | 14.3 | 19.6 | 60.3 | 39.7 | 850 | 1.0 | 122 | 0.08 | 14.4 |
| 6 | 31.6 | 16.1 | 10.5 | 58.2 | 41.8 | 940 | 1.9 | 151 | 0.06 | 15.2 |
| 7 | 36.9 | 19.5 | 9.0 | 65.4 | 34.6 | 900 | 1.0 | 122 | 0.08 | 8.3 |
| 8 | 25.1 | 18.3 | 11.3 | 54.7 | 45.3 | 1,070 | 1.1 | 133 | 0.11 | 13.0 |
| 9 | 45.3 | 23.1 | 6.1 | 74.5 | 25.5 | 1,490 | 1.9 | 125 | 0.09 | 9.0 |
| 10 | 21.3 | 15.9 | 9.5 | 46.7 | 53.3 | 1,080 | 1.5 | 103 | 0.12 | 10.5 |
| 11 | 36.8 | 20.5 | 9.8 | 67.1 | 32.9 | 1,430 | 1.8 | 158 | 0.06 | 9.3 |

NOTE.—Warpage is the extent of warping of central line of cylindrical products having total length of 1.5 m., outside diameter of 0.5 m. and inside diameter of 0.4 m.

A more comprehensive understanding of the invention can be obtained by referring to the following illustrative examples which are not intended, however, to be unduly limitative of the invention.

Example 1

Twenty eight parts by weight of feldspar (A) produced in the Nagasaki Prefecture of Japan, 10 parts by weight of "Gairome" clay (A) produced in the Gifu Prefecture of Japan, 15 parts by weight of "Kibushi" clay produced in the Gifu Prefecture of Japan and 37 parts by weight of "Tohseki" (A) produced in the Kumamoto Prefecture of Japan were mixed. "Tohseki" is liparite decomposed by weathering to a hard substance.

In the mixing of each raw materials, feldspar and Tohseki had been crushed by crushers in advance, and subjected to wet-grinding in ball mills. "Gairome" clay and "Kibushi" clay which had been subjected to the water elutriation were added therein and the mixture was stirred to produce raw stuff slurry. This slurry was adjusted by passing all of it through 100 mesh screen so as to give less than 26.5 percent by weight of crude particle fractions which were greater than 10µ in the measurement of particle size by Andreasen pipette method. Thereafter the slurry was dehydrated and freed from soluble free salts with a filter-press. Resulting cake containing about 25 percent water was treated with a kneader, extruded into cylindrical crude stuff having an outside diameter of 1.5 m., an inside diameter of 0.9 m. and a length of 1 m. and dried in a drying chamber for about two weeks at a temperature of 35° to 45° C. and at a relative humidity of 70 to 90 percent. This step was carried out to make the drying homogeneous and to make the workability better. The crude stuff of which the water content is reduced to about 21 percent by weight was shaped into desired shape with a machine lathe and sent to a drying chamber to be dried for 5 to 10 days until water content was lowered to 1 percent by weight. Thereafter glazing was carried out by spraying, dried and fired in a muffle furnace at about 1280° C. to obtain finished product.

The chemical compositions and mineralogical constitutions (determined by X-ray) of each raw materials used were as follows.

| | Ignition loss | $SiO_2$ | $Al_2O_3$ | $Fe_2O_3$ | $TiO_2$ | CaO | MgO | $K_2O$ | $Na_2O$ | Total | Quartz | Kaolinite | Sericite | Albite |
|---|---|---|---|---|---|---|---|---|---|---|---|---|---|---|
| "Tohseki" (A) produced in the Kumamoto Prefecture | 3.40 | 78.70 | 13.90 | 1.03 | 0.27 | 0.10 | 0.09 | 2.46 | 0.39 | 100.34 | 57.3 | 4.8 | 35.0 | |
| Feldspar (A) produced in the Nagasaki Prefecture | 0.68 | 79.34 | 12.57 | 0.15 | 0.03 | 0.43 | 0.02 | 0.64 | 6.15 | 100.01 | 37.5 | | | 50.3 |
| "Kibushi" clay produced in the Gifu Prefecture | 11.66 | 54.54 | 29.29 | 1.49 | 1.13 | 0.21 | 0.53 | 1.05 | 0.13 | 100.03 | 7.4 | 85.9 | | |
| "Gairome" clay produced in the Gifu Prefecture | 13.29 | 49.39 | 33.95 | 1.25 | 0.84 | 0.06 | 0.29 | 0.26 | 0.12 | 99.45 | 4.8 | 90.2 | | |

The chemical compositions and mineralogical constitution of the fired products from the mixtures of raw materials in the example, determined by the chemical analysis and X-ray method, respectively, are shown as follows:

| | |
|---|---|
| Ignition loss | 0.03 |
| $SiO_2$ | 74.00 |
| $Al_2O_3$ | 20.47 |
| $Fe_2O_3$ | 1.09 |
| $TiO_2$ | 0.54 |
| CaO | 0.27 |
| MgO | 0.18 |
| $K_2O$ | 1.66 |
| $Na_2O$ | 1.81 |
| Total | 100.05 |
| Cristobalite | 25.0 |
| Mullite | 20.3 |
| Quartz | 9.7 |
| Tridymite | 6 |
| Total | 55.0 |

The characteristic properties of the products were as follows.

Thermal expansion coefficient (room temperature~800° C.) _____ $6.25 \times 10^{-6}$
Mechanical strength, kg./cm.$^2$ _____ 1450
Resistance to acid, percent _____ 0.10
Resistance to thermal shock, ° C. _____ 155
Volume resistivity, Ω-cm. _____ $2.6 \times 10^{12}$ Testing conditions of each characteristic properties were as follows:

Mechanical strength.—Span 100 mm., transverse breaking test
Resistance to acid.—Power method
Resistance to thermal shock.—Temperature difference of crack forming Example 2

The preparation was carried out from a mixture of 35 parts by weight of "Tohseki" (B) produced in the Kumamoto Prefecture, 25 parts by weight of feldspar (B) produced in the Nagasaki Prefecture and 40 parts by weight of "Gairome" clay produced in the Gifu Prefecture and with the use of common ball mill and filter pressure. The cake containing 25 percent by weight of water was treated in a kneader, extruded into cylindrical crude stuff bodies, and after drying, fired at a temperature of 1350° C. The raw material mixture was passed through a 100 mesh screen at the step of slurry discharged from a ball mill to make the crude particles of greater than 10μ, less than 23.5 percent by weight by the particle size measurement of Andreasen pipette method.

The chemical compositions and mineralogical constitution (by X-ray) of above-mentioned raw materials used were as follows:

Cristobalite _____ 36.2
Mullite _____ 21.0
Quartz _____ 4.0
Tridimite _____ 0

Total _____ 61.2

The characteristic properties of the products were as follows:

Thermal expansion coefficient (room temperature~800° C.) _____ $7.0 \times 10^{-6}$
Mechanical strength, kg./cm.$^2$ _____ 1430
Resistance to acid, percent _____ 0.07
Resistance to thermal shock, ° C. _____ 148
Volume resistivity, Ω-cm. _____ $1.5 \times 10^{12}$ Example 3

The mixing and fine grinding were carried out with a ball mill from 30 parts by weight of quartzite produced in the Fukushima Prefecture, 20 parts by weight of "Gairome" clay produced in the Gifu Prefecture, 20 parts by weight of "Kibushi" clay produced in the Aichi Prefecture and 30 parts by weight of feldspar (B) produced in the Nagasaki Prefecture. Water and, as deflocculant, 0.5 part by weight of water glass and 0.1 part by weight of sodium carbonate were added thereto and the prepared slurry was passed through a 100 mesh screen to make particles of greater than 10μ, less than 28.8 percent by weight, shaped by casting, dried and fired at a temperature of 1320° C.

The chemical compositions and mineralogical constitu-

| | Ignition loss | SiO$_2$ | Al$_2$O$_3$ | Fe$_2$O$_3$ | TiO$_2$ | CaO | MgO | K$_2$O | Na$_2$O | Total | Quartz | Kaolinite | Feldspar |
|---|---|---|---|---|---|---|---|---|---|---|---|---|---|
| Quartzite produced in Fukushima Prefecture | 0.20 | 99.61 | | 0.06 | | | | | | 99.87 | 100.0 | | |
| Feldspar (B) produced in the Nagasaki Prefecture | 0.54 | 79.36 | 12.56 | 0.15 | 0.03 | 0.39 | 0.06 | 0.41 | 6.59 | 100.09 | 39.3 | | 49.1 |
| "Gairome" clay produced in the Gifu Prefecture | 15.20 | 49.83 | 33.27 | 0.98 | 0.25 | 0.08 | 0.04 | 0.40 | 0.05 | 100.10 | 4.5 | 91.5 | |
| "Kibushi" clay produced in the Aichi Prefecture | 13.02 | 51.74 | 30.28 | 1.88 | 1.14 | 0.07 | 0.62 | 1.00 | 0.19 | 99.94 | 10.1 | 80.3 | | tion of above-mentioned raw materials used were as follows.

| | Ignition loss | SiO$_2$ | Al$_2$O$_3$ | Fe$_2$O$_3$ | TiO$_2$ | CaO | MgO | K$_2$O | Na$_2$O | Total | Quartz | Kolinite | Sericite | Albite |
|---|---|---|---|---|---|---|---|---|---|---|---|---|---|---|
| "Tohseki" (B) produced in the Kumamoto Prefecture | 2.72 | 78.82 | 14.11 | 0.79 | 0.15 | 0.04 | 0.05 | 3.25 | 0.22 | 100.15 | 56.9 | 5.3 | 35.2 | |
| Feldspar (B) produced in the Nagasaki Prefecture | 0.54 | 79.36 | 12.50 | 0.15 | 0.03 | 0.39 | 0.06 | 0.41 | 6.59 | 100.03 | 39.3 | | | 49.1 |
| Gairome" clay (B) produced in the Gifu Prefecture | 13.22 | 49.07 | 33.51 | 1.80 | 0.70 | 0.04 | 0.35 | 1.16 | 0.11 | 99.96 | 5.6 | 83.5 | | |

The chemical compositions and mineralogical constitutions of the fired products from the mixtures of raw materials in the example, determined by the chemical analysis and X-ray method, respectively, are shown as follows:

Ignition loss _____ 0.05
SiO$_2$ _____ 71.69
Al$_2$O$_3$ _____ 23.01
Fe$_2$O$_3$ _____ 1.11
TiO$_2$ _____ 0.38
CaO _____ 0.14
MgO _____ 0.05
K$_2$O _____ 1.73
Na$_2$O _____ 1.90

Total _____ 100.06

The chemical compositions and mineralogical constitutions of the fired products from the mixtures of raw materials in the examples are shown as follows:

Ignition loss _____ 0.03
SiO$_2$ _____ 75.10
Al$_2$O$_3$ _____ 21.29
Fe$_2$O$_3$ _____ 0.51
TiO$_2$ _____ 0.31
CaO _____ 0.16
MgO _____ 0.15
K$_2$O _____ 0.43
Na$_2$O _____ 2.16

Total _____ 100.14

| | |
|---|---|
| Cristobalite | 40.2 |
| Mullite | 22.4 |
| Quartz | 4.4 |
| Tridimite | 0 |
| Total | 67.0 |

The characteristic properties of the products were as follows:

| | |
|---|---|
| Thermal expansion coefficient (room temperature ~800° C.) | $6.5 \times 10^{-6}$ |
| Mechanical strength, kg./cm.$^2$ | 1390 |
| Resistance to acid, percent | 0.06 |
| Resistance to thermal shock, ° C. | 143 |
| Volume resistivity, Ω-cm. | $1.6 \times 10^{12}$ |

What is claimed is:

1. A porcelain insulator having a total crystal content of about 35 to 75% by weight, in which cristobalite crystal is present in the amount of about 25 to 50% by weight, quartz is present in the amount of about 5 to 15% by weight and the essential balance is mullite crystal, based on the total weight of the porcelain, said insulator comprising about 65 to 80% by weight of $SiO_2$, about 2.0 to 4.0% by weight of alkali oxide, about 0.5 to 1.5% by weight of $Fe_2O_3$, about 0.2 to 1.3% by weight of $TiO_2$, less than about 0.5% by weight of each of CaO and MgO and less than about 1.0% by weight of other impurities, wherein the $SiO_2/Al_2O_3$ ratio is about 2.8 to 4.5 and the $K_2O/Na_2O$ ratio is about 0.01 to 1.5.

2. A method for producing porcelain suitable for use as an insulator which comprises mixing raw materials of minerals containing as pure minerals about 20 to 30% by weight of feldspar, about 40 to 55% by weight of quartz and about 30 to 50% by weight of clay, shaping the mixture, drying the shaped mass, and firing said mass at a temperature of about 1,250° C to 1,380° C., the thus obtained porcelain having a total crystal content of about 35 to 75% by weight, said crystal content comprising about 25 to 50% by weight cristobalite, about 5 to 15% by weight quartz and the essential balance being mullite crystal, based on the total weight of porcelain and containing about 65 to 80% by weight of $SiO_2$, about 2.0 to 4.0% by weight of alkali oxide, about 0.5 to 1.5% by weight of $Fe_2O_3$, about 0.2 to 1.3% by weight of $TiO_2$, less than about 0.5% by weight of each of CaO and MgO and less than about 1.0% by weight of other impurities, wherein the $SiO_2/Al_2O_3$ ratio is about 2.8 to 4.5 and the $K_2O/Na_2O$ ratio is about 0.01 to 1.5.

3. A method for producing porcelain suitable for use as an insulator which comprises mixing raw materials of minerals containing as pure minerals about 20 to 30% by weight of feldspar, about 40 to 55% by weight of quartz and about 30 to 50% by weight of clay and further adding at least one kind of raw material containing as the principal components $Al_2O_3$, $Fe_2O_3$ and $TiO_2$, shaping the mixture, drying the shaped mass, and firing said mass at a temperature of about 1,250° C. to 1,380° C., the thus obtained porcelain having a total crystal content of about 35 to 75% by weight, said crystal content comprising about 25 to 50% by weight cristobalite, about 5 to 15% by weight quartz and the essential balance being mullite crystal, based on the total weight of porcelain and containing about 65 to 80% by weight of $SiO_2$, about 2.0 to 4.0% by weight of alkali oxide, about 0.5 to 1.5% by weight of $Fe_2O_3$, about 0.2 to 1.3% by weight of $TiO_2$, less than about 0.5% by weight of each of CaO and MgO and less than about 1.0% by weight of other impurities, wherein the $SiO_2/Al_2O_3$ ratio is about 2.8 to 4.5 and the $K_2O/Na_2O$ ratio is about 0.01 to 1.5.

References Cited

UNITED STATES PATENTS

| | | | |
|---|---|---|---|
| 1,642,754 | 9/1927 | Singer | 106—46 |
| 2,898,217 | 8/1959 | Selsing | 106—46 |

OTHER REFERENCES

Skinner, K. G., et al., Effect of $TiO_2$, $Fe_2O_3$ and Alkali on Mineralogical and Physical Properties of Mullite Type and Mullite-Forming $Al_2O_3$-$SiO_2$ Mixtures, in J. Amer. Cer. Soc., 36 (No. 11), 1953, pp. 349–356.

Kingery, W. D., Introduction to Ceramics, Wiley & Sons, New York, 1960, pp. 26–27.

TOBIAS E. LEVOW, *Primary Examiner.*

W. R. SATTERFIELD, *Assistant Examiner.*

U.S. Cl. X.R.

106—68